United States Patent [19]

Chatterjee

[11] Patent Number: 5,701,179
[45] Date of Patent: Dec. 23, 1997

[54] METHOD AND SYSTEM FOR MEASURING DIMENSIONS OF AN EDGE OF A PART

[75] Inventor: Chanchal Chatterjee, Lafayette, Ind.

[73] Assignee: Medar, Inc., Farmington Hills, Mich.

[21] Appl. No.: 536,616

[22] Filed: Sep. 29, 1995

[51] Int. Cl.⁶ .................................................. G01B 11/24
[52] U.S. Cl. ............................ 356/376; 382/152; 382/154
[58] Field of Search ........................... 356/374, 376, 356/354, 356; 250/550, 560, 561; 382/152, 154; 348/135, 136, 131

[56] References Cited

U.S. PATENT DOCUMENTS

| | | |
|---|---|---|
| 3,614,237 | 10/1971 | Kyle ........................................ 356/376 |
| 4,525,858 | 7/1985 | Cline et al. . |
| 4,583,854 | 4/1986 | Lozar . |
| 4,700,224 | 10/1987 | Miyasaska et al. . |
| 4,845,763 | 7/1989 | Bandyospadhysy et al. . |
| 5,361,308 | 11/1994 | Lee et al. . |
| 5,436,462 | 7/1995 | Hull-allen . |

*Primary Examiner*—Hoa Q. Pham
*Attorney, Agent, or Firm*—Brooks & Kushman P.C.

[57] ABSTRACT

A non-contact, non-destructive measurement method and system for the edge of parts such as the cutting edge or "hone" of tools wherein the shape and dimensions of the hone are measured with high accuracy (i.e., within 5 microns) and repeatability. Given a tool that is mechanically fixtured under the system and a set of user-defined parameters, the measurement system automatically detects a measurement area for different orientations of the tool. Manual selection of the measurement area is also possible. The system then uses a combination of Moiré interferometry and image analysis algorithms to compute the shape and dimension of the hone for both radius and waterfall types.

20 Claims, 8 Drawing Sheets

METHOD AND SYSTEM FOR MEASURING DIMENSIONS OF AN EDGE OF A PART

CROSS-REFERENCE TO RELATED APPLICATION

This application is related to U.S. patent application Ser. No. 08/262,130, filed Jun. 17, 1994, now U.S. Pat. No. 5,636,025, entitled "Optical Measuring System", which application is hereby incorporated in its entirety by reference.

TECHNICAL FIELD

This invention relates to automated measurement methods and systems and, more particularly, to automated, non-contact measurement methods and systems for measuring dimensions of an edge of a part such as tool hone shapes and dimensions.

BACKGROUND ART

In recent years, there is a great deal of interest in the accurate measurement of the cutting edge or "hone" of tools. Tool manufacturers have extensively studied the life and durability of their products. It has been learned through such research that the average life of tools are greatly dependent on manufacturing the tools to their intended specifications. Of most interest is the cutting radius of the tool. A considerable focus has, therefore, shifted to the measurement of the cutting radius by non-contact and non-destructive methods to a very high accuracy.

Coupled with the above facts, an additional challenge is offered by the fact that the cutting radius is decreasing in size as the precision in the manufacturing process increases. It is not uncommon to find one-half thousands of an inch for the radius of the hone. The resolution of the imaging system is the limiting factor in such measurements.

The U.S. patent to Lee et al., U.S. Pat. No. 5,361,308, discloses the measurement of cutting tool wear. The wear of the cutting tool may have many different shapes and is usually measured by its volume and area. The method uses a structured or coherent lighting technique with a Michelson interferometer and a beam splitter to generate the striped patterns for depth measurement. Lee et al. thresholds the stripes (generated by their system) by a set of thresholding algorithms. They then use a set of expert systems-based rules and meta rules to "correct" many defects due to the optical system and also obtain the required measurement. For example, they use rules to join broken lines, merge lines and locate peaks and valleys. These rules are mostly based on heuristics.

The U.S. patent to Bandyopadhyay et al., U.S. Pat. No. 4,845,763, uses an illumination technique to obtain a high contrast image of the tool. The wear then appears as "clouds", which are measured by simple image processing steps. A set of parameters are extracted from the tool. Bandyopadhyay measures the area of tool wear directly with an imaging system.

Other U.S. patents also disclose the use of machine vision to measure tool wear such as the U.S. patents to Miyasaka et al. U.S. Pat. No. 4,700,224 and Lozar U.S. Pat. No. 4,583,854.

SUMMARY OF THE INVENTION

An object of the present invention is to provide a method and system for measuring dimensions of an edge of a part with increased accuracy in spite of the fact that the resolution of the camera is barely adequate to obtain such measurements.

Another object of the present invention is to provide a method and system for measuring dimensions from an edge of a part using a three-dimensional (3D) image of the part based upon Moiré interferometry.

A still further object of the present invention is to provide a method and system for measuring dimensions of a hone of a part using images obtained by Moiré interferometry. The method and system include two basic components: (1) placement of a measurement area in the image of the part, and (2) accurate measurement of the hone dimensions in the measurement area.

In carrying out the above objects and other objects of the present invention, a method is provided for automatically measuring dimensions of an edge of a part at a vision station. The method includes the steps of determining a measurement window, generating a 3-D digital image containing the part to be measured at the vision station, and placing the measurement window in the digital image of the part. The measurement window includes at least one edge of the part. Finally, the method includes the step of processing the 3-D digital image within the measurement window to obtain at least one dimension associated with the at least one edge of the part.

Preferably, the step of generating is based on Moiré interferometry.

Also, preferably, the step of determining includes the step of placing an inspection window in the image. The inspection window includes the at least one edge of the part. The method also includes the step of detecting a reference point within the inspection window. The measurement window is placed a predetermined distance from the reference point along the at least one edge of the part.

Still preferably, the at least one edge is a hone and the step of processing obtains the shape of the hone.

Pursuant to the present invention, a system is also provided which is capable of measuring the shape and dimensions of the cutting edge or hone of tools.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 12a illustrates a cutoff angle, theta, for valid data whereas FIG. 12b illustrates a hone area for circle calculation;

BEST MODE FOR CARRYING OUT THE INVENTION

Figure 1:
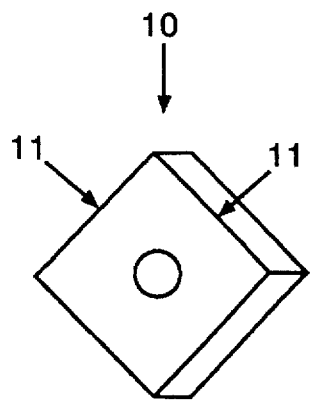
FIG. 1 is an explanatory view of a tool whose hone is to be measured utilizing the method and system of the present invention.

In general, the method first acquires a 3D image of a tool with the techniques of Moiré interferometry, as described in the above-noted patent application. An example of a tool 10 with the location of the cutting edges 11 is shown in FIG. 1.

In order to acquire a 3D view of the tool, the part can be fixtured in two possible ways under the camera. These are respectively known as the (1) Nose view and (2) Flank view. Illustrations of the two views are provided in the left and right portions, respectively, of FIG. 2a. These are not the only two ways to fixture the part under the camera. The invention does not exclude other views from which the hone can be measured.

In the nose view 20, the part is fixtured under its camera 22 such that a corner of the cutting side of the part is directly under the camera 22. A section of the two hones 11 on either side of the corner are within the camera's field of view.

In the flank view 21, the part is fixtured on its side, such that a corner of the cutting side is directly under its camera 22 with a hone (commonly known as the flank) 11 oriented horizontally across the image. The corner with a section of the flank edge are within the camera's field of view.

In each of the views 20 and 21, the respective cameras 22 are coupled to an image analyzer 23 for analyzing the 3-D images formed by the cameras 22.

For each of the above-mentioned views, in general, the user places an inspection window in the image which can also be the entire image. Within the inspection window, the method automatically detects a reference point with respect to which the measurement is performed. This process of automatically selecting the reference point is known as visual fixturing.

With respect to the reference point, a measurement window of user-specified width and height is placed at a user-specified distance from the reference point along the hone 11. This automatic step can be ignored and the user can manually place the measurement window at a predetermined spot in the image.

Figure 2B:
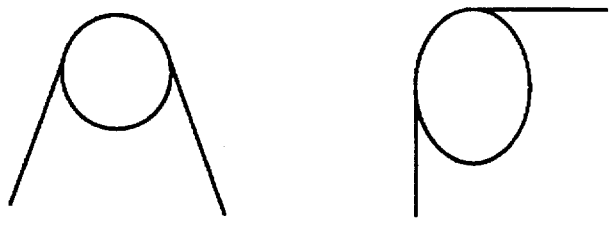
FIG. 2b illustrates profiles along a vertical section of radius and waterfall hones.
Figure 2A:
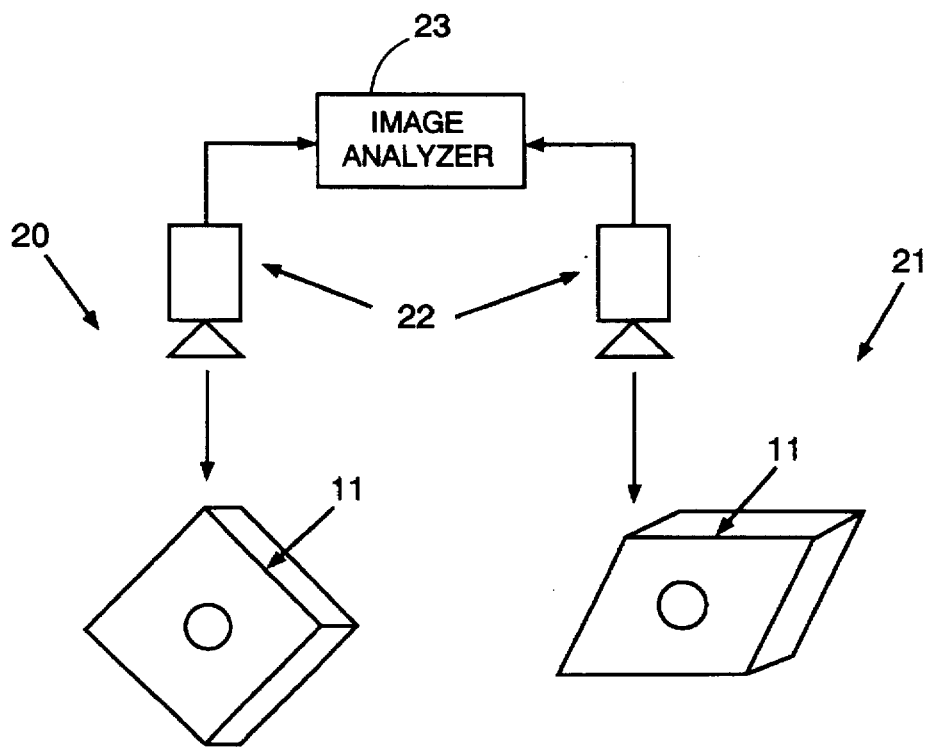
FIG. 2a is an explanatory view of two views of the tool under cameras, namely, nose and flank views of the tool.

Within the measurement window, a detailed measurement is performed. The shape and dimension of the hone are computed as described in detail hereinbelow. There are two types of measurements that are performed for each hone depending on the type of the hone. If a profile of the hone is of circular nature, then this hone is called a radius hone. If the hone profile is more elliptical in shape, then this hone is called a waterfall hone. Both types of hones can be measured and detected by the system. FIG. 2b shows a profile along a vertical section of radius and waterfall hones.

At the end of the measurement process, detailed graphical and numerical results are presented to the user. Some statistics such as the mean and standard deviation from various measurements of the same hone is reported. The deviation of fitted shape from the actual shape are also reported. Graphical view of the hone fitted shape overlaid on it are also shown. These results, however, do not preclude the possibility of many other means or types of results that can be presented with the present invention.

The different embodiments of the present invention include the following:

(1) method and system of automatically detecting the reference point for different views of the part such as the nose and flank views;

(2) method and system of automatically detecting the reference point in the presence of measurement and image acquisition noise in the image data;

(3) method and system of automatically placing the measurement window at a given distance from the reference point along the hone;

(4) method and system of measuring the radius hone by finding its radius to any size even in a low resolution image;

(5) method and system of measuring the radius hone by finding the deviation of the measured hone from its intended radius by fitting a circle of given radius to the hone;

(6) method and system of measuring the waterfall hone by finding its major and minor axis to any size even in a low resolution image;

(7) method and system of measuring the waterfall hone by finding the deviation of the measured hone from its intended axes by fitting an ellipse of given axes to the hone.

Visual Fixturing for the Nose View

Figure 3:
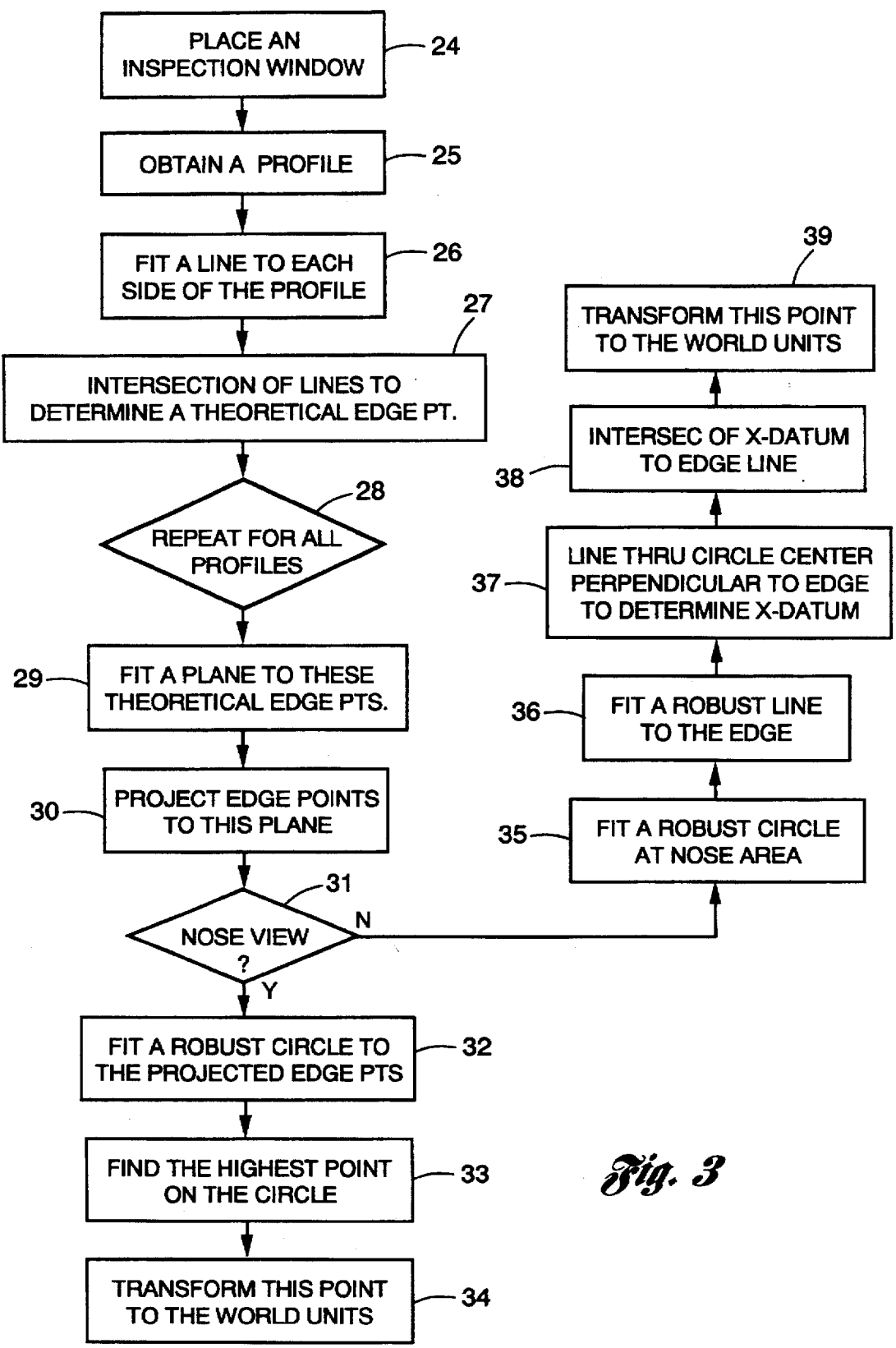
FIG. 3 is a block diagram flow chart illustrating automatic determination of visual fixturing for nose and flank views of the tool.

Referring now to FIG. 3, there is shown a block diagram for automatic determination of the visual fixturing for the nose view of the part. Detailed description of each block is given below.

Figure 4:
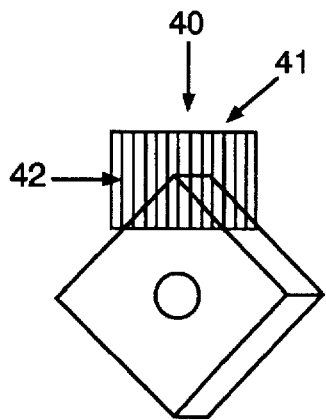
FIG. 4 is a view illustrating an inspection window which includes the nose or corner of the cutting side of the tool, wherein the inspection window includes a number of vertical profiles.

Within the image, at block 24, the user first places an inspection window that includes the nose or a corner of the cutting side of the tool. FIG. 4 shows a view of this inspection window 41.

Referring now to blocks 25–28, the inspection window 41 is sliced into a number of vertical profiles 42 (i.e. 5 to 50 profiles). Each such slice obtains a projection or profile 51 shown in FIG. 5. The profile 51 looks like an inverted V with the tip of the V representing the cutting edge 52 of the tool. Vertical lines 42 show the lines along which projection data 50 is obtained. For each profile 42 within the inspection window, a plot such as 50 is obtained. From this plot is determined the theoretical edge point. FIG. 6 shows the method for obtaining this edge point. First, straight lines 61 are fitted to the two sides of the profile 51. The intersection of these two lines 62 is the theoretical edge point 62. In fitting the straight lines 61, a robust fitting method discussed later is utilized. Furthermore, a percentage such as 90% of the profile data is used to fit straight lines 61 so that the curved section of the projection is avoided and an accurate fit of the lines are obtained.

A theoretical edge point 62 is obtained for each profile 52 within the inspection window 41. Due to spurious and noisy data obtained during image acquisition, there are erroneous edge points 62 obtained by the above method. This noisy data is cleaned and processed by the following steps to reliably determine a reference point.

Figure 7:
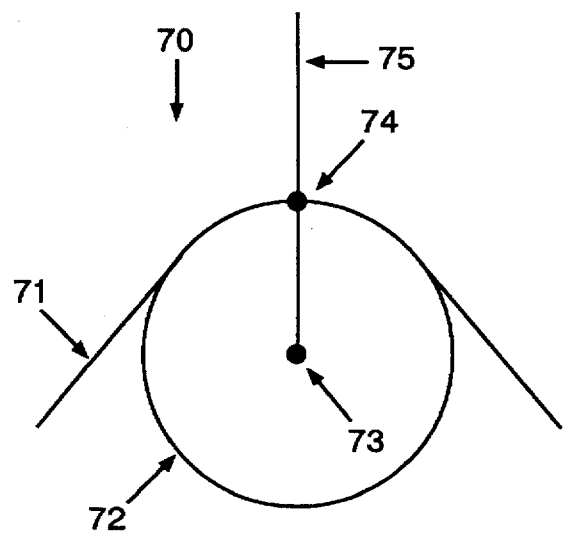
FIG. 7 is a view of a circular shape represented by projected edge points in a fitted plane.

Referring now to blocks 29-34, next a plane is fit to the theoretical edge points 62 obtained for all profiles 42 by the above-mentioned method. Once again, a robust fitting method is used (discussed later) for the plane. The edge points 62 are projected onto this plane. In the fitted plane, the projected edge points represent a circular shape 71 shown in FIG. 7 below. To this shape 71, a circle 72 is fitted by the robust fitting method. A vertical line 75 through the center 73 of the circle is the X-datum. The point of intersection of this line 75 with the circle 72 is the highest point 74 of the circle. This point 74 is the reference point.

Visual Fixturing of the Flank View

Figure 8:
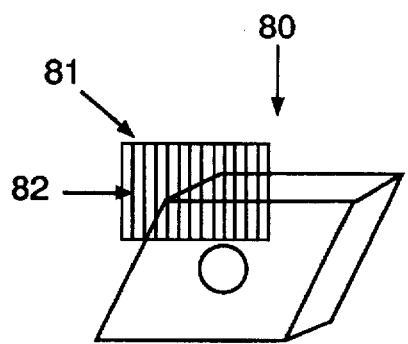
FIG. 8 is a view similar to the view of FIG. 4 but for a flank view.

Once again, points along the cutting edge are obtained within the field of view shown in FIG. 8 below. This figure is analogous to FIG. 4 for the nose view.

Figure 9:
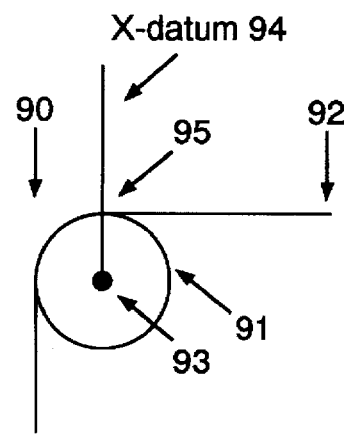
FIG. 9 is a view similar to FIG. 7 and illustrates a typical plot of projected edge points.

Referring again to blocks 24-30 of FIG. 3, the inspection window 81 is divided into a number (5-50) vertical profiles 82 from which one obtains the theoretical edges points 62 (refer to FIG. 6). These points are projected onto a best fit plane fitted robustly through these edge points obtained from all profiles. The projected edge points have a typical plot shown in FIG. 9.

Referring to blocks 35-39, a circle 91 is fitted to the nose area, and a straight line 92 is fitted to the flank edge. A vertical line 94 through the center 93 of the circle and perpendicular to the straight line 92 is determined as the X-datum. The intersection of this line with straight line is the reference point 95.

Robust Fitting of a Circle, Line and Plane to Noisy Data

In this section, there is discussed the robust fitting methods for circles, lines and planes that are used in various steps of the present invention. For a theoretical overview, refer to "Robustness in Statistics", by Robert L. Launer and Graham N. Wilkinson, ACADEMIC PRESS, 1979.

Noise in data can be obtained due to measurement errors, quantization and the acquisition process. Fitting of conic sections such as circles, ellipses, lines and planes to this noisy data by the common least squares method can lead to erroneous results. The *Robust Estimation Theory* helps alleviate this process. A brief overview in the current context is given below.

Given 2D scattered data points $(x_i, y_i)$ for $i=1, \ldots, n$, a conic curve such as a circle, line or plane can be represented by a function $f(x_i, \theta) = y_i$, $i=1, \ldots, n$. Similarly, given 3D scattered data $(x_i, y_i, z_i)$, $i=1, \ldots, n$, a quadric curve such as sphere and ellipsoid can be represented by a function $f(x_i, y_i, \theta) = z_i$ for $i=1, \ldots, n$. Here, $\theta$ is the parameter vector to be estimated. The least squares approach computes the sum of squared errors:

$$\sum_{i=1}^{n} \rho(x_i, y_i, \theta) = \sum_{i=1}^{n} (z_i - f(x_i, y_i, \theta))^2. \quad (1)$$

Differentiating $$\sum_{i=1}^{n} \rho(x_i, y_i, \theta)$$

with respect to $\theta$, we get $$\sum_{i=1}^{n} \psi(x_i, y_i, \theta) = 0,$$

from which we obtain $\theta$.

The Robust M-Estimation method uses the following error function $\rho$ instead of the one above:

$$\rho(x_i, y_i, \theta) = \begin{cases} (z_i - f(x_i, y_i, \theta))^2 & \text{if } |z_i - f(x_i, y_i, \theta)| \leq a \\ a|z_i - f(x_i, y_i, \theta)| - \frac{a^2}{2} & \text{if } |z_i - f(x_i, y_i, \theta)| > a. \end{cases} \quad (2)$$

Differentiating with respect to $\theta$, we obtain:

$$\sum_{i=1}^{n} \psi(x_i, y_i, \theta) = 0,$$

from which we obtain $\theta$.

A difficulty in using the above method is the choice of "tuning constant" $a$. For example, if the $(x_i, y_i)$ values are multiplied by a constant, the original estimator is not necessarily multiplied by the same constant. To create the scale invariant version of the M-estimator, we find the solution $\theta$ of $$\sum_{i=1}^{n} \psi\left(\frac{(x_i, y_i, \theta)}{s}\right) = 0,$$

where $s$ is a robust estimate of scale such as $$s = \frac{\text{median}|z_i - \text{median} z_i|}{0.6745}.$$

If the sample arises from a Gaussian distribution, $s$ is an estimate of standard deviation $\sigma$. The "tuning constant" is chosen to be 1.5. If the sample actually comes from a Gaussian distribution, solution to $$\sum_{i=1}^{n} \psi\left(\frac{(x_i, y_i, \theta)}{s}\right) = 0 \text{ gives } \theta = \frac{\sum_{i=1}^{n} y_i}{n},$$

i.e., the mean of all $y_i$'s which is desired.

Example—Line Fit

Equation of a line is: $y = ax + b = w^T \theta$, where $w^T = [x\ 1]$ and $\theta^T = [a\ b]$. First an estimate of $\theta$ is obtained from the raw data. This value of $\theta$ is used for the remaining computations. Scale $\theta$ is computed from:

$$s = \frac{\text{median}|y_i - w_i^T \theta|}{0.6745}.$$

$$\rho(x_i, y_i, \theta) = \begin{cases} (y_i - w_i^T \theta)^2 & \text{if } |y_i - w_i^T \theta| \leq a \\ a|y_i - w_i^T \theta| - \frac{a^2}{2} & \text{if } |y_i - w_i^T \theta| > a. \end{cases} \quad (3)$$

$$\psi(x_i,y_i,\theta) = \begin{cases} -aw_i & \text{if } y_i - w_i^T\theta < -a \\ (y_i - w_i^T\theta)w_i & \text{if } |y_i - w_i^T\theta| \leq a \\ aw_i & \text{if } y_i - w_i^T\theta > a. \end{cases} \quad (4)$$

$$\sum_{i=1}^{n} \psi\left(\frac{(x_i,y_i,\theta)}{s}\right) = 0$$

can now be solved by any standard method.

Other conic fits can be easily obtained by reducing the equation to the $y_i=W_i^T\theta$ form. The method performs very well with circle and line fits involved in the hone measurement system.

Placing the Measurement Window

Figure 13:
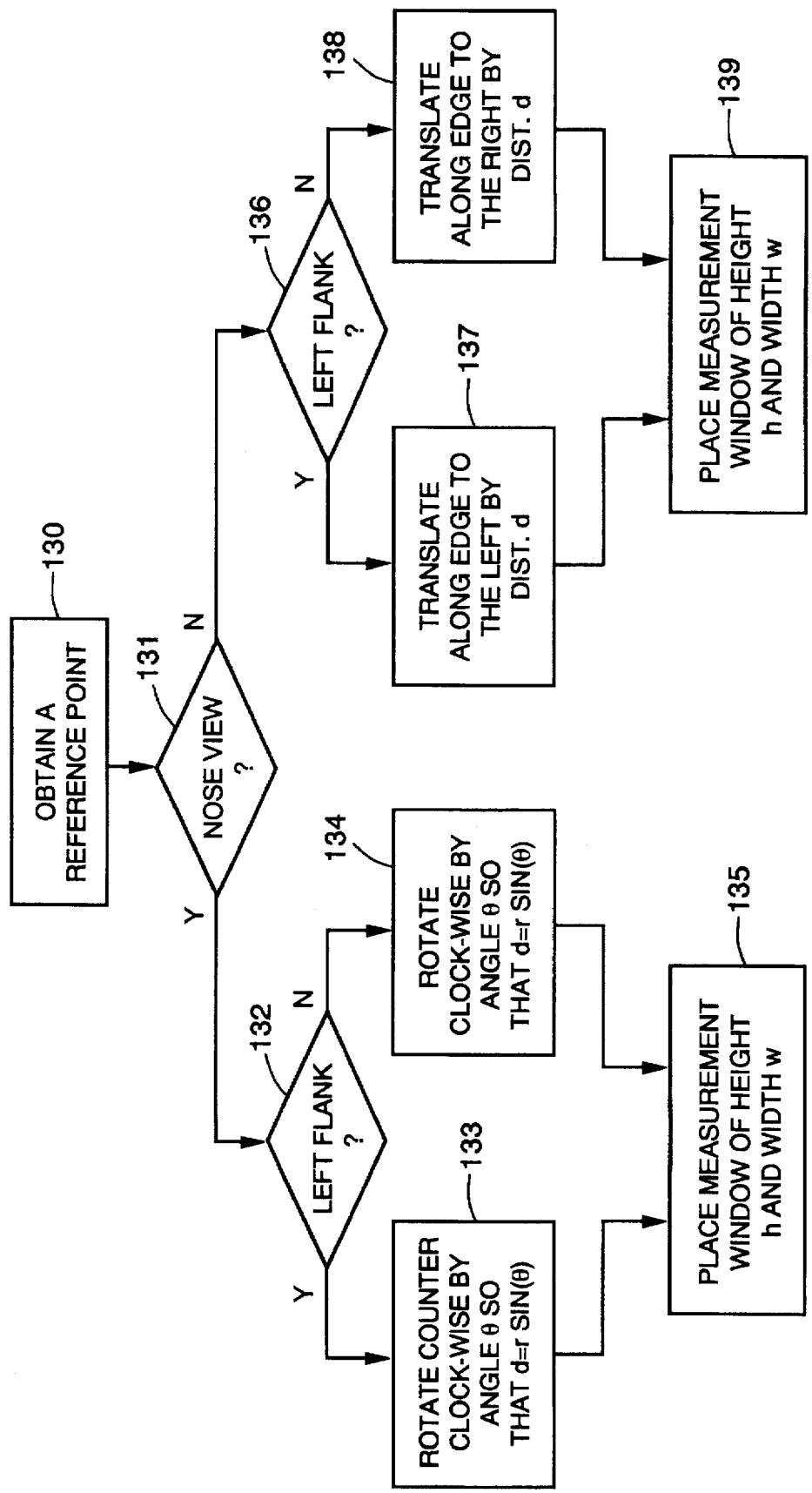
FIG. 13 is a block diagram flow chart illustrating a method for placing the measurement window.

Referring now to blocks 130–135 in FIG. 13, in the automatic mode, the measurement window is placed with respect to the reference point determined above. The user selects a left or right nose or flank view. Based upon this selection, the measurement window is placed to the left or right of the reference point on the cutting edge or hone. FIG. 13 gives a block diagram of the method for placing the measurement window.

Figure 10:
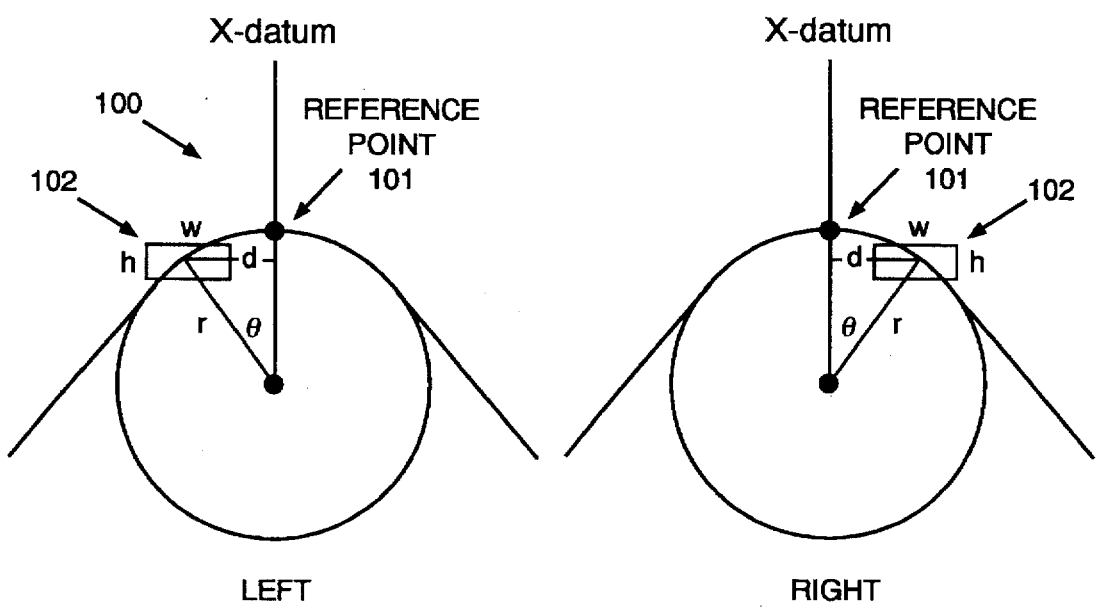
FIG. 10 illustrates left and right pictorial views of the placement of a measurement window for the nose view.
Figure 11:
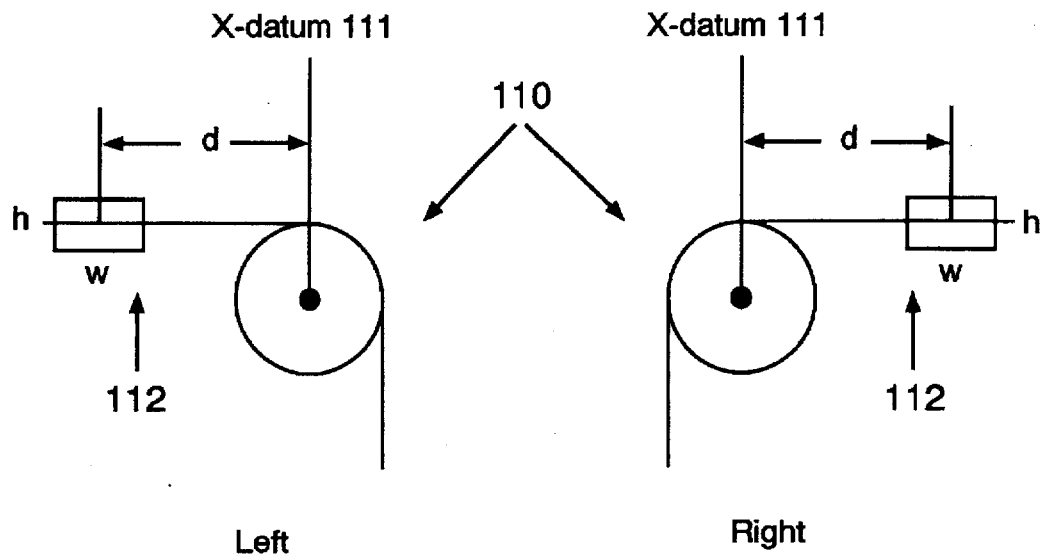
FIG. 11 illustrates left and right pictorial views of the placement of a measurement window for the flank view.

The measurement window is placed at a user-selectable distance d from the X-datum to the left or right according to the user-selection. The height h and width w of the measurement window are also user-selectable. FIG. 10 shows the measurement locations on the left or right flanks for the nose view. Since the radius r of the circle is known (computed above), one can compute an angle θ from the X-datum to the left or right according to the formula:

$$d=r \sin(\theta) \quad (5)$$

Here, d is the distance selected by the user. The vertical distance of the measurement window from the reference point is determined from r-rcos(θ), where θ is determined from equation (5) above. The horizontal distance of the measurement window is −d or +d from the X-datum based upon the left or right flank selected by the user. FIG. 10 gives a pictorial view of the placement of the measurement window 102 for the nose view.

For the flank view, a user-selectable distance d is chosen on the horizontal edge from the X-datum. The height h and width w of the inspection area are also user-selectable. The right or left flanks are chosen based upon two possible orientations of the part in the flank view as shown below. FIG. 10 gives a pictorial view of the placement of the measurement window 112 for the flank view.

The discussions above complete the left and right placement of the measurement window for both nose and flank views.

Measuring the Radius Hone

Figure 14:
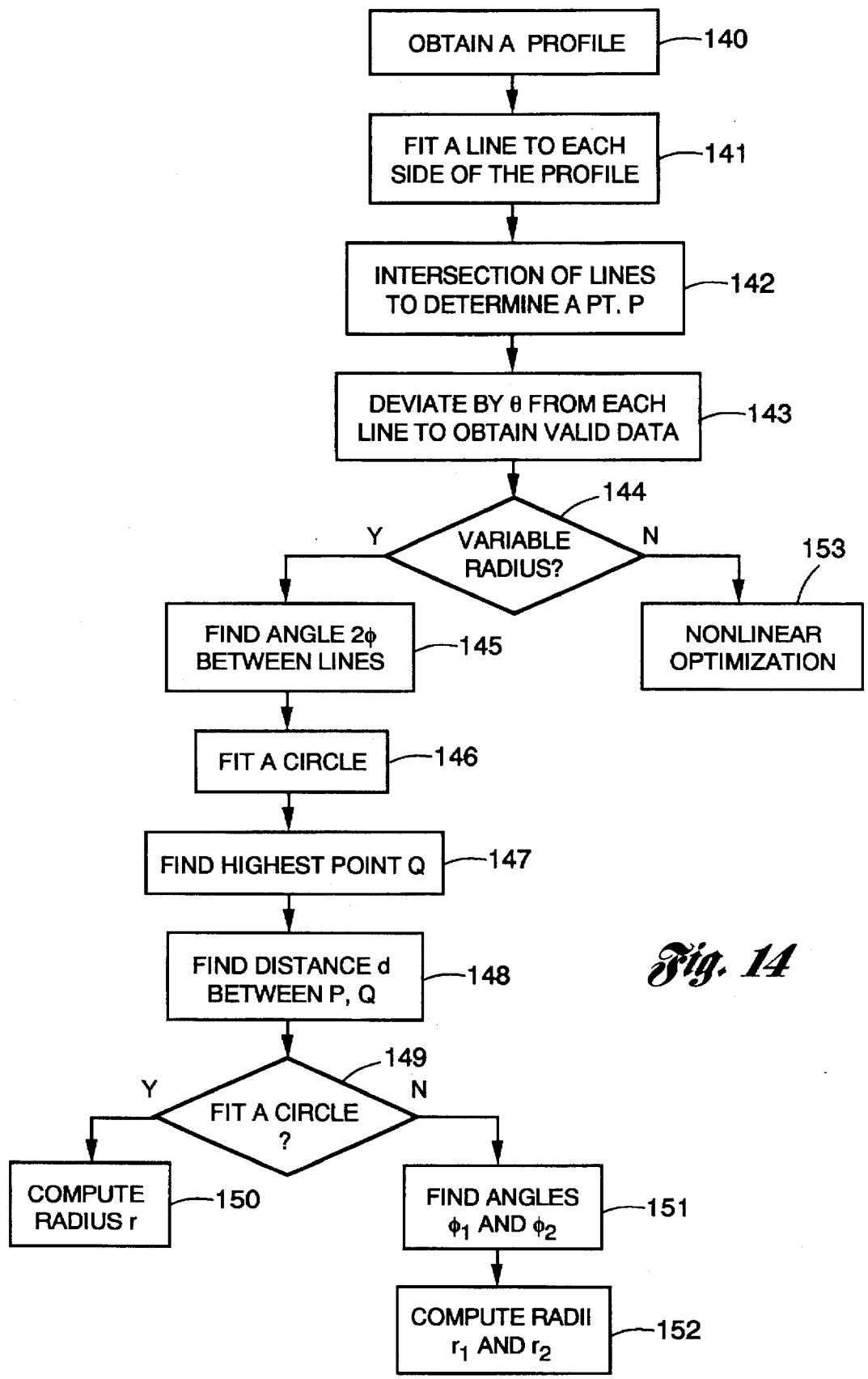
FIG. 14 is a block diagram flow chart illustrating a measurement process.

The radius hone illustrated in FIG. 2b has a circular shape of the hone. A circle is, therefore, fitted to this hone. There are two possible variations of this fitting task. If just the radius of the hone is required, we can fit a circle of variable radius to estimate the hone radius. If the intended radius of the hone is known and one wishes to compare the measured hone with its intended shape, then one can fit a circle of known radius to the hone. Both these cases are discussed below. An added difficulty for the above computations is the lack of resolution due to the small size of the hone. Methods to obtain reliable results under these resolution conditions is also discussed below. Blocks 140–150 of FIG. 14 provide a block diagram of the measurement process.

Variable Radius Circle Fit

After the measurement region is identified, we need to obtain an accurate measurement for the hone radius. This measurement is plagued by the following problems: (1) The projection data contains long straight sides and a small rounded tip for the radius calculation. A very difficult problem is to identify the point where the straight line ends and the circle begins, and (2) The resolution at the hone is very small. In some cases, we get just 5–10 pixels to fit a circle. Any circle calculation from this data is very sensitive to noise and is mostly erratic. In order to overcome both these problems, an innovative technique discussed below is used.

Figure 12:
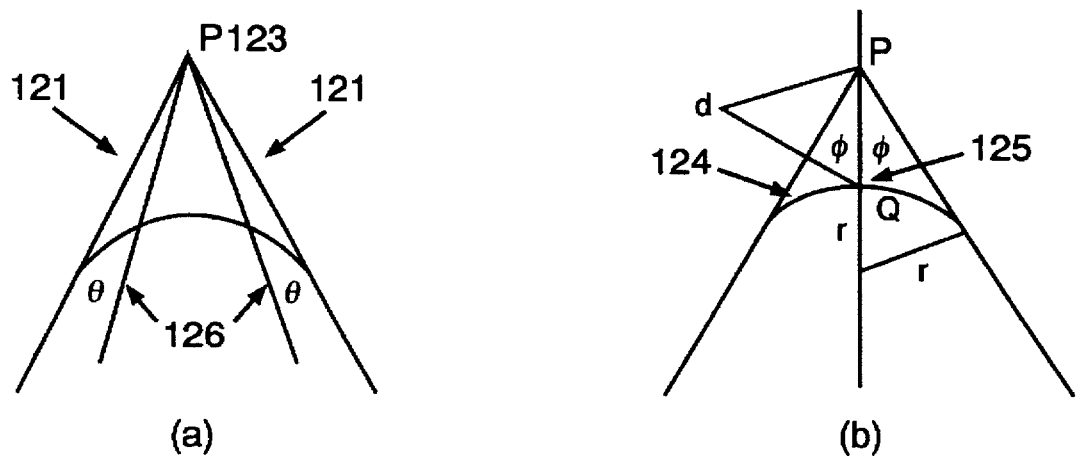

FIG. 12 shows a typical projection plot. This method consists of the following steps:

1) Fit straight lines 121 to the two sides of the projection plot;
2) Obtain the intersection point P 122 of these straight lines, and the angle 2φ between them;
3) Deviate an angle θ 125 from the edges to identify a cone 123 within which the valid data lie. This angle θ 126 is known as the cutoff angle;
4) Fit a circle 124 to this data and obtain the highest point Q 125 of the fit;
5) Compute the distance d from P 122 to Q 125;
6) Assuming the straight edges are tangent to the circle, and symmetric around the hone (these are very good assumptions), obtain the radius from the following equation:

$$\frac{r}{r+d} = \sin(\phi),$$

where r is radius of the hone. Obtain r from the equation:

$$r = \frac{d\sin(\phi)}{1-\sin(\phi)}. \quad (6)$$

Fixed Radius Circle Fit

In this measurement, the radius of the circle is given. The circle of this given radius is fitted to the hone. The problem is mainly to determine the center of this circle fitted to the given noisy data. As indicated at block 153 of FIG. 14, this is a nonlinear optimization problem that has been solved iteratively by using the Newton's method for nonlinear optimization. As is true with nonlinear methods, the solution is correct if a good initial guess is available. The initial guess is obtained from a variable radius circle fit. Thus, if the variable radius is sufficiently close to the given radius, then the method works well. Otherwise, heuristic rules need to be used to obtain an initial estimate.

The detailed description of the method is given below. The equation for the circle is: $x^2+y^2+bx+cy+d=0$. Here, $d=-r^2$, where r is the radius of the circle that is known. Parameters b and c contain the circle center information. Thus, the fixed axis circle fit is a nonlinear optimization problem if we construct it as follows:

$x^2+y^2+bx+cy-r^2=0$ under known radius r.

Here, radius r is known and (b,c) are unknowns.

The Newton's method for a function f(x)=0 uses the update rule:

$x_{k+1} = x_k - F^{-1}(x_k)f(x_k)$, where $x_k = [b\ c]^T$, and $F(x) = \nabla_x f(x)$. Define function g as the least squared expression of the circle equation:

$$g(x) = \sum_{i=1}^{n} (x_i^2 + y_i^2 + bx_i + cy_i - r^2)^2.$$

Here, $f(x) = \nabla_x g(x)$ is the 2×1 gradient vector of g(x) and $F(x) = \nabla_x f(x)$ is the 2×2 Hessian matrix. Terms of f and F are:

$$f[0] = 2 \sum_{i=1}^{n} (x_i^2 + y_i^2 + bx_i + cy_i - r^2)x_i,$$

$$f[1] = 2 \sum_{i=1}^{n} (x_i^2 + y_i^2 + bx_i + cy_i - r^2)y_i,$$

$$F[0][0] = 2 \sum_{i=1}^{n} x_i^2,$$

$$F[0][1] = F[1][0] = 2 \sum_{i=1}^{n} x_i y_i, F[1][1] = 2 \sum_{i=1}^{n} y_i^2.$$

We first perform a least squares variable radius circle fit to obtain (b,c) which form the initial values for the iteration above.

Measuring the Waterfall Hone

An illustration of the waterfall hone is given in FIG. 2b. Here, we need to fit an ellipse to the hone data. As seen with the radius hone, we need to fit either (1) a variable axes ellipse or (2) an ellipse with known major and minor axes. Blocks 140–149 and blocks 151 and 152 of FIG. 14 gives a block diagram of the measurement process.

Variable Radius Ellipse Fit

As seen with the variable radius circle fit case, this method also suffers from the lack of data for a reliable fit. We extended the method for the circle fit to the ellipse fit case by fitting two circles instead of one. Referring to FIG. 12, the highest point Q 125 of the projection plot is determined as before. The line joining P 123 to Q 125 subtends two different angles with the two edges 121 of the projection plot. Let these angles be $\phi_1$ to the left and $\phi_2$ to the right. Distance d between P 123 and Q 125 is also determined. The two circle radii $r_1$ and $r_2$ are computed from the formulas below:

$$r_1 = \frac{d \sin(\phi_1)}{1 - \sin(\phi_1)} \text{ and } r_2 = \frac{d \sin(\phi_2)}{1 - \sin(\phi_2)}. \tag{7}$$

These radii $r_1$ and $r_2$ are reported.

Fixed Radius Ellipse Fit

Here, the major and minor axes of the fitted ellipse are given. An ellipse of given axes is fitted to noisy data. The method again is nonlinear of higher degree. The solution is sensitive to the starting estimate obtained from a variable radius ellipse fit. Since the ellipse equation is harder to evaluate in any orientation due to the xy terms, the projection plot is rotated so that the flank axis is horizontal. In this orientation, an ellipse with major axis oriented horizontally is fitted to the projection plot.

The equation for the ellipse is:

$$x^2 + ay^2 + bx + cy + d = 0. \text{ Here, } a = \left(\frac{A}{B}\right)^2,$$

where A is the major axis and B is the minor axis that are known, b and c contain the ellipse center information, and $$d = \frac{b^2}{4} + \frac{c^2}{4a} - A^2.$$

Thus, the fixed axes ellipse fit is a nonlinear optimization problem if we construct it as follows:

$$x^2 + ay^2 + bx + cy + \frac{b^2}{4} + \frac{c^2}{4a} - A^2 = 0.$$

Here, (a,A) are known and (b,c) are unknowns.

The Newton's method for a function $f(x)=0$ uses the update rule:

$x_{k+1} = x_k - F^{-1}(x_k)f(x_k)$, where $x_k = [b\ c]^T$, and $F(x) = \nabla_x f(x)$. Define function g as the least squared expression of the ellipse equation:

$$g(x) = \sum_{i=1}^{n} \left( x_i^2 + ay_i^2 + bx_i + cy_i + \frac{b^2}{4} + \frac{c^2}{4a} - A^2 \right)^2.$$

Here, $f(x) = \nabla_x g(x)$ is the 2×1 gradient vector of g(x) and $F(x) = \nabla_x f(x)$ is the 2×2 Hessian matrix. Terms of f and F are:

$$f[0] = 2 \sum_{i=1}^{n} \left( x_i^2 + ay_i^2 + bx_i + cy_i + \frac{b^2}{4} + \frac{c^2}{4a} - A^2 \right)\left( x_i + \frac{b}{2} \right)$$

$$f[1] = 2 \sum_{i=1}^{n} \left( x_i^2 + ay_i^2 + bx_i + cy_i + \frac{b^2}{4} + \frac{c^2}{4a} - A^2 \right)\left( y_i + \frac{c}{2a} \right)$$

$$F[0][0] = 2 \sum_{i=1}^{n} \left( x_i + \frac{b}{2} \right)^2 +$$

$$\sum_{i=1}^{n} \left( x_i^2 + ay_i^2 + bx_i + cy_i + \frac{b^2}{4} + \frac{c^2}{4a} - A^2 \right)$$

$$F[0][1] = 2 \sum_{i=1}^{n} \left( y_i + \frac{c}{2a} \right)^2 +$$

$$\sum_{i=1}^{n} \frac{1}{a} \left( x_i^2 + ay_i^2 + bx_i + cy_i + \frac{b^2}{4} + \frac{c^2}{4a} - A^2 \right)$$

We first perform a least squares variable axes ellipse fit to obtain (b,c) which form the initial values for the iteration above.

Measurement of the T-land

Figure 5:
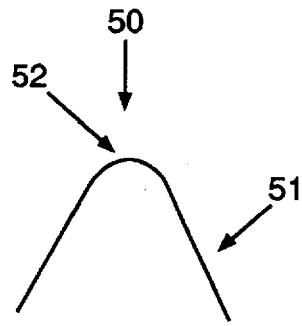
FIG. 5 is a view of a projection or profile of a slice of the window of FIG. 4.
Figure 6:
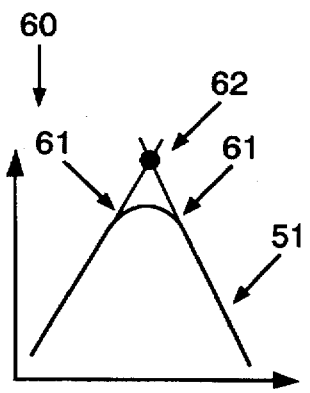
FIG. 6 is a view illustrating a method for obtaining a theoretical edge point.
Figure 15:
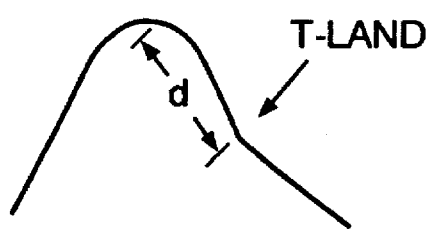
FIG. 15 is a graph which shows a T-land profile.

In the discussions above, it has been assumed that the projection profile of the hone has two straight line edges as shown in FIG. 5. In the case of the T-land, one of the two edges is straight for a fixed distance d and then deflects to a different straight line. Thus, in fitting straight lines to each side of the profile, we have to consider this deflection. FIG. 15 shows a T-land profile.

In order to avoid this problem, the user specifies the distance d for which the edge remains straight before the deflection. The edge is considered only till this deflection and the remainder is eliminated from all computation.

Statistics of the Reported Results

Figure 16:
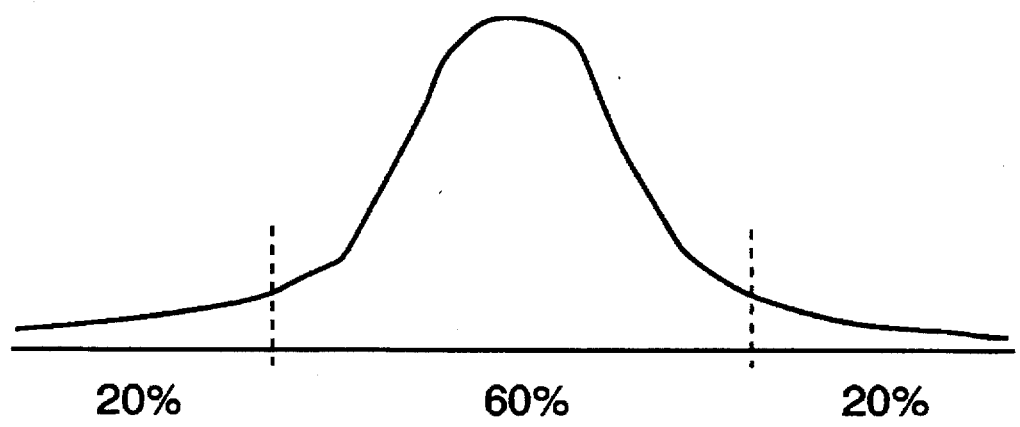
FIG. 16 is a graph showing probability density of numerical data reported by the method and system of the present invention.

The statistical processing of the numerical data that are reported by the system is now described. Since several measurements are obtained from the different projection plots within the measurement window, the final results are computed by the robust estimation method. The numerical data, say the fitted radius, is used to determined a frequency plot or histogram. This plot is an approximate probability distribution of the measured data. From the tails of thins plot a percentage say 20% of the data is eliminated, i.e., 20% of the data from the highest and lowest ends are removed. The remaining data is used to compute the mean and standard deviation. For each measurement (from each projection plot) the deviation from the computed means is also reported. The mean of this deviation is the standard deviation of the total measurement. FIG. 16 shows the probability density of the data, and region within this density that is considered for the computation of mean and standard deviation.

While the best mode for carrying out the invention has been described in detail, those familiar with the art to which this invention relates will recognize various alternative designs and embodiments for practicing the invention as defined by the following claims.

What is claimed is:

1. A method for automatically measuring dimensions of an edge of a part at a vision station, the method comprising the steps of:

determining a measurement window having a bounded area;

generating a 3-D digital image containing the part to be measured at the vision station;

placing the measurement window in the digital image of the part so that the bounded area bounds a subset of the digital image including at least one edge of the part; and processing the subset of the 3-D digital image within the bounded area to obtain at least one dimension associated with the at least one edge of the part.

2. The method as claimed in claim 1 wherein the step of generating is based on Moiré interferometry.

3. The method as claimed in claim 1 wherein the step of determining includes the step of placing an inspection window in the image, the inspection window including the at least one edge of the part, and detecting a reference point within the inspection window and wherein the measurement window is placed a predetermined distance from the reference point along the at least one edge of the part.

4. The method as claimed in claim 3 wherein the inspection window includes a plurality of vertical profiles which represent the at least one edge of the part and further comprising detecting a theoretical edge point on each of the vertical profiles.

5. The method as claimed in claim 4 further comprising the step of projecting the theoretical edge points to a plane, the projected theoretical edge points representing a circular shape, one of the projected theoretical edge points being the reference point.

6. The method as claimed in claim 1 wherein the at least one edge is a hone and wherein the step of processing obtains a shape of the hone.

7. The method as claimed in claim 6 wherein the hone is a radius hone and wherein the step of processing includes the step of fitting a circle of variable radius to the radius hone to obtain a measured radius of the radius hone.

8. The method as claimed in claim 6 wherein the hone is a radius hone and further including the step of defining a circle having a predetermined radius and wherein the step of processing includes the step of fitting the circle to the radius hone to obtain a deviation of a measured radius from the predetermined radius.

9. The method as claimed in claim 6 wherein the hone is a waterfall hone and wherein the step of processing includes the step of fitting an ellipse of variable major and minor axes to the waterfall hone to obtain measured major and minor axes of the waterfall hone.

10. The method as claimed in claim 6 wherein the hone is a waterfall hone and further including the step of defining an ellipse having predetermined major and minor axes and wherein the step of processing includes the step of fitting the ellipse to the waterfall hone to obtain deviations of measured major and minor axes from the predetermined major and minor axes, respectively.

11. A system for automatically measuring dimensions of an edge of a part at a vision station, the system comprising:

means for determining a measurement window having a bounded area;

means including a camera for generating a 3-D digital image, the image containing the part to be measured at the vision station;

means for placing the measurement window in the digital image of the part so that the bounded area bounds a subset of the digital image including at least one edge of the part; and means for processing the subset of the 3-D digital image within the bounded area to obtain at least one dimension associated with the at least one edge of the part.

12. The system as claimed in claim 11 wherein the means for generating includes a Moiré interferometry system.

13. The system as claimed in claim 11 wherein the means for determining includes means for placing an inspection window in the image, the inspection window including the at least one edge of the part, and means for detecting a reference point within the inspection window and wherein the measurement window is placed a predetermined distance from the reference point along the at least one edge of the part.

14. The system as claimed in claim 13 wherein the inspection window includes a plurality of vertical profiles which represent the at least one edge of the part and further comprising means for detecting a theoretical edge point on each of the vertical profiles.

15. The system as claimed in claim 14 further comprising means for projecting the theoretical edge points to a plane, the projected theoretical edge points representing a circular shape, one of the projected theoretical edge points being the reference point.

16. The system as claimed in claim 11 wherein the at least one edge is a hone and wherein the means for processing obtains a shape of the hone.

17. The system as claimed in claim 16 wherein the hone is a radius hone and wherein the means for processing includes means for fitting a circle of variable radius to the radius hone to obtain a measured radius of the radius hone.

18. The system as claimed in claim 16 wherein the hone is a radius hone and further including means for defining a circle having a predetermined radius and wherein the means for processing includes means for fitting the circle to the radius hone to obtain a deviation of a measured radius from the predetermined radius.

19. The system as claimed in claim 16 wherein the hone is a waterfall hone and wherein the means for processing includes means for fitting an ellipse of variable major and minor axes to the waterfall hone to obtain measured major and minor axes of the waterfall hone.

20. The system as claimed in claim 16 wherein the hone is a waterfall hone and further including means for defining an ellipse having predetermined major and minor axes and wherein the means for processing includes means for fitting the ellipse to the waterfall hone to obtain deviations of measured major and minor axes from the predetermined major and minor axes, respectively.

* * * * *